United States Patent [19]

Erb

[11] 4,114,597
[45] Sep. 19, 1978

[54] UNITARY SOLAR COLLECTOR

[75] Inventor: Robert Allan Erb, Valley Forge, Pa.

[73] Assignee: The Franklin Institute, Philadelphia, Pa.

[21] Appl. No.: 645,648

[22] Filed: Dec. 31, 1975

[51] Int. Cl.² .............................................. F24J 3/02
[52] U.S. Cl. .................................... 126/271; 126/270; 165/170; 165/172; 237/1 A
[58] Field of Search .............. 126/270, 271; 237/1 A; 165/170, 172; 52/171, 209, 616

[56] References Cited

U.S. PATENT DOCUMENTS

| B 512,745 | 1/1976 | Deminet et al. | 126/271 |
| 3,022,781 | 2/1962 | Andrassy | 126/271 |
| 3,076,450 | 2/1963 | Gough et al. | 126/271 |
| 3,200,820 | 8/1965 | Garrett | 126/271 |
| 3,239,000 | 3/1966 | Meagher | 126/271 |
| 3,859,980 | 1/1975 | Crawford | 126/271 |
| 3,923,039 | 12/1975 | Falbel | 126/271 |
| 3,934,323 | 1/1976 | Ford et al. | 126/271 |

Primary Examiner—Kenneth W. Sprague
Assistant Examiner—James C. Yeung
Attorney, Agent, or Firm—Weiser, Stapler & Spivak

[57] ABSTRACT

A unitary solar collector for transfer of thermal energy which is a synthetic thermoplastic unit. The unit has a solar-energy transmitting region and a solar-energy absorbing region. The unit is useful for heating purposes.

68 Claims, 15 Drawing Figures

UNITARY SOLAR COLLECTOR

This invention relates to synthetic-plastic, low cost collectors for thermal energy from solar radiation.

A solar collector is the essential part of equipment which transforms solar radiant energy to some other useful energy form. In a solar collector, energy transfer is from a distant source of radiant energy like the sun to a fluid. Broadly speaking, solar collectors may be used with or without radiation concentration. In flat plate collectors which perform without radiation concentration, which are the subject of the invention, the area absorbing solar radiation is the same as the area intercepting solar radiation. Solar collectors of the rigid, flat plate type present a particular set of problems in the transfer or collection of energy and in association with conduction and radiation losses. Some of the problems associated with other types of solar collectors (e.g. focusing) and solutions suggested in their manufacture and use cannot readily be applied to collectors of the flat plate type.

Conventional flat plate type collectors of solar energy generally have a solar energy absorbing surface which may be black, means for a transferring the absorbed energy to a fluid, and an envelope transparent to solar radiation over the solar absorbing surface to reduce convection and radiation losses. Generally the fluid which is circulated is water (often with glycol antifreeze added) or air.

The principal applications of such collectors is in solar heating systems for homes and other buildings, hot water heaters, swimming pool heaters, heating water for solar distillation and other such uses. The units can be used for air conditioning when operated at high temperatures in conjunction with absorption-type refrigeration units.

Flat plate solar collectors are usually mounted in a stationary position as an integral part of a wall or a roof structure in solar house heating. A conventional collector has been described to consist of a wood or metal frame with a flat black absorber inside. Material such as fiberglass, polymer foam or sawdust is used underneath the absorbing surface for insulation and the top of the frame is covered with a thick window glass. The absorber is a black-painted metal sheet containing a plurality of spaced tubes for a coolant. Such flat plate collectors are described in "SOLAR ENERGY THERMAL PROCESSES" by Duffie and Beckman, Wiley Interscience Publication, John Wiley & Sons, New York 1974 and "SOLAR ENERGY TECHNOLOGY AND APPLICATIONS" by J. Richard Williams, Ann Arbor Science, 1974, pages 120–125 and pages 9 and 10, respectively.

The detailed description of the operation of each one of the components of the solar collector is a fairly complicated problem. See General Characteristics of Flat Plate Solar Collector in the first of the two above-mentioned references, pages 123 and seq.

In the construction of a flat plate energy collector one seeks to maximize the various factors which influence the collector's performance. The construction of a flat plate solar energy system is thus influenced by numerous variables; adjustment to maximize one may often adversely effect another variable, thus decreasing the overall desirability of this system. Moreover the flat plate solar collector may not be considered as a single entity because it is mounted as an integral part of a structure such as a roof, which creates new areas of problems. Typical of these is that the collector is exposed to extreme variations in temperatures and in climatic conditions which influence its mechanical integrity and stability differently from the roof structure itself.

For many years the attempts and problems to build satisfactory solar heater systems of various types have been reflected in the patent literature. For instance U.S. Pat. No. 3,387,602 to Thomason reports shattering of a solar heat collector and the rapid failure of a tough plastic film when used as an inner glazing material in a solar heat collector.

Various types of solar panels have been disclosed in the patent literature. For instance see U.S. Pat. Nos. 2,358,476; 2,553,302; 3,077,190; 3,254,643 and 3,387,602. These patents underscore the difficulties and the various attempts to overcome them. For instance, Thomason in U.S. Pat. No. 3,254,643 suggests attaching a reflective cover section to increase the intensity of available solar energy on the collector. The heat collector is of a complicated structure including insulation, sheet metal and plastic or glass. The heat collecting metal is a screen or plastic. In U.S. Pat. No. 3,387,602, Thomason recommends the use of certain parts and materials including fibrous materials as a solar heat collecting overlayment to overcome the problems of heat expansion and contraction due to temperature changes.

The patent to Meagher, U.S. Pat. No. 3,239,000 discloses a box-like construction which includes tubular plastic sections impregnated with carbon black.

Flexible collectors are also known. In U.S. Pat. No. 3,022,781, Andrassy suggests using a flexible plastic bag as a solar heater unit. Thomason in his more recent U.S. Pat. No. 3,369,539 also proposes an improved solar heat collector which is a clear plastic sealed bag.

It is also noteworthy that the most recent patent to issue in this field to date, U.S. Pat. No. 3,859,980 to Crawford, teaches in its review of the prior art (column 1) that the prior art devices include rigid structures which have serious drawbacks such as difficulty in handling, special preparation of the roof, complicated structures, are expensive to manufacture and to install. In 1975, when the Crawford patent issued, he thought best to advocate, rather than the rigid structures of the prior art, a flexible heating unit which may be rolled or folded and may be easily placed on a roof or other suitable place of use, and unfolded into operative position. The solar heating unit which Crawford developed consists of pairs of spaced manifolds and a plurality of tubes connected to and extending between the manifolds so that the intermediate tubes present a maximum surface to be acted on by the solar energy or for heating fluid flowing through them. To provide air insulating spaces both above and below the intermediate tubes in the unit, an envelope for clear material, such as plastic, closes the entire unit and the two outermost tubes hold this plastic envelope in spaced relation. The advantage of the Crawford solar heating unit is its flexible and readily dismountable construction wherein no glass or other rigid transparent cover over the device is required.

An article in Plastics World in May 1973, page 32 discloses an ABS heat exchanger for a swimming pool constructed with a series of internally channeled heat exchange panels with an inlet header at one end and a collection header at the other, adapted with connections to the pool and the existing pumping system. Carbon black is added to improve heat absorption. Panels constructed for swimming pool water heating are generally not suitable for use in conjunction with solar heating of homes or other buildings, as solar collector panels, especially because they lack the efficiency required of the system at higher temperatures.

Solar collector panels available on the market consist of several components including a collector box, a cover plate (generally glass or plastic), an absorber plate (generally metal), mounted in a mounting block, a cover assembly and various necessary mounting and other assembly fixtures. The panels' construction generally includes insulation like foam. Typical solar collector panels are advertized by such manufacturers as Chamberlain as Solar Collector Panels, PPG under the name of Baseline Solar Collector and Solar Systems, Inc. under the name of Spectro Collector Module. A typical panel of 3 × 7 feet weighs 190 lbs. All of these panels require assembly of their components prior to installation and their mounting into place individually to cover the desired area.

A major problem in utilizing solar energy for heating buildings and for other like applications has been the high cost per unit area of the collector panels. As can be seen from the review of the prior art, the high cost of flat plate collectors is principally due to their complex and multi-component structures requiring substantial hand labor. These problems are further complicated because the structures are not uniformly made of one material but are fabricated of metal, plastic (rigid or not), wood and other type materials. These materials, of course, have differential expansion and contraction due to heating and cooling which require special assembly and components.

There is thus a serious need for low cost solar energy collectors for thermal energy from solar radiation. The solar flat panel collector of the present invention is a unitary structure made of a single material, a synthetic thermoplastic which is a one piece structure free of the separate, auxiliary parts and structures commonly used in the prior art collectors. The thermal energy collector of the invention is a unit of which the cost per unit area is remarkably lower than what has been achieved theretofore. Moreover, through a one piece structure, the collector of the invention forms with the structure to which it is attached, such as a roof, a dimensionally stable and dynamic yet operational structure.

The objects of this inventions are manifold. One important object of the invention is to provide a flat panel solar collector which is adapted to be used in modular arrangements to form larger panels. Another object is to provide such a panel which alone or in conjunction with others is adapted to be affixed in mounting arrangement with or in communication with the area or environment to be heated. Another object is a solar panel which is dimensionally stable and dynamic when such mounting relationship notwithstanding exposure to great variations of temperatures and climatic conditions.

Another object is a solar panel which is one type of material, a synthetic thermoplastic in which certain portions are solar energy collecting and other portions are transparent or translucent to solar energy. Another object is a one piece unitary solar panel which is of great dimensional strength, of light weight, adapted for simple installation, fabrication, of improved asthetic appearance, free of metal or other non-plastic components, and free of joints.

Another important object of the invention is to provide for a low cost flat panel collector which is of coextruded synthetic plastic, that is a structure which from its formation is unitary. Another object of the invention is to provide a unitary solar collector which does not require an external frame. Another object of the invention is to provide a system which can withstand freezing of water because of its absence of joints and its deformability without breakage with the expansion of freezing water; this permits its use in direct heating of potable water supplies. (Systems for solar heating which must use glycol-water mixtures are required to be separated from domestic hot water lines with a double heat exchanger). Yet another object of the invention is a solar collector which has vertical sections or fins which are capable of absorbing thermal energy. Another object of the invention is to provide a solar collector for transfer of thermal energy, which areas cooperate with an area which is transparent to solar radiation.

Yet another important object of the invention is the provision of a coextruded solar collector which has several layers adjacent to each other, some sandwiched in between a pair of other layers. Another object of the invention is a solar collector having provisions for channels for heat transfer fluids which can be air or liquids such as water or mixture of water with organic liquids or such organic liquids alone.

Yet another important object of the invention is a solar energy collector constructed of a coextruded, unitary, synthetic polymer which has energy absorbing channels and energy transmitting channels. Another object of the invention is to provide such a solar energy collector made of a UV-stabilized polycarbonate, such as "Lexan" or "Merlon", and a poly (methylmethacrylate), such as "Plexigla". Yet another important object of the invention is a rigid solar flat panel which is unitary and where the single material of which it is fabricated complies with preselected requirements of tensile strength, tensile modulus, elongation, impact strength, hardness, thermal expansion and thermal conductivity and other physical structural requirements. Another object of the invention is to provide unitary solar collectors which are available in great lengths (e.g., 30 feet) without joints or other discontinuities.

Other objects of the invention will become apparent from the description including the drawings, wherein.

Figure 1:
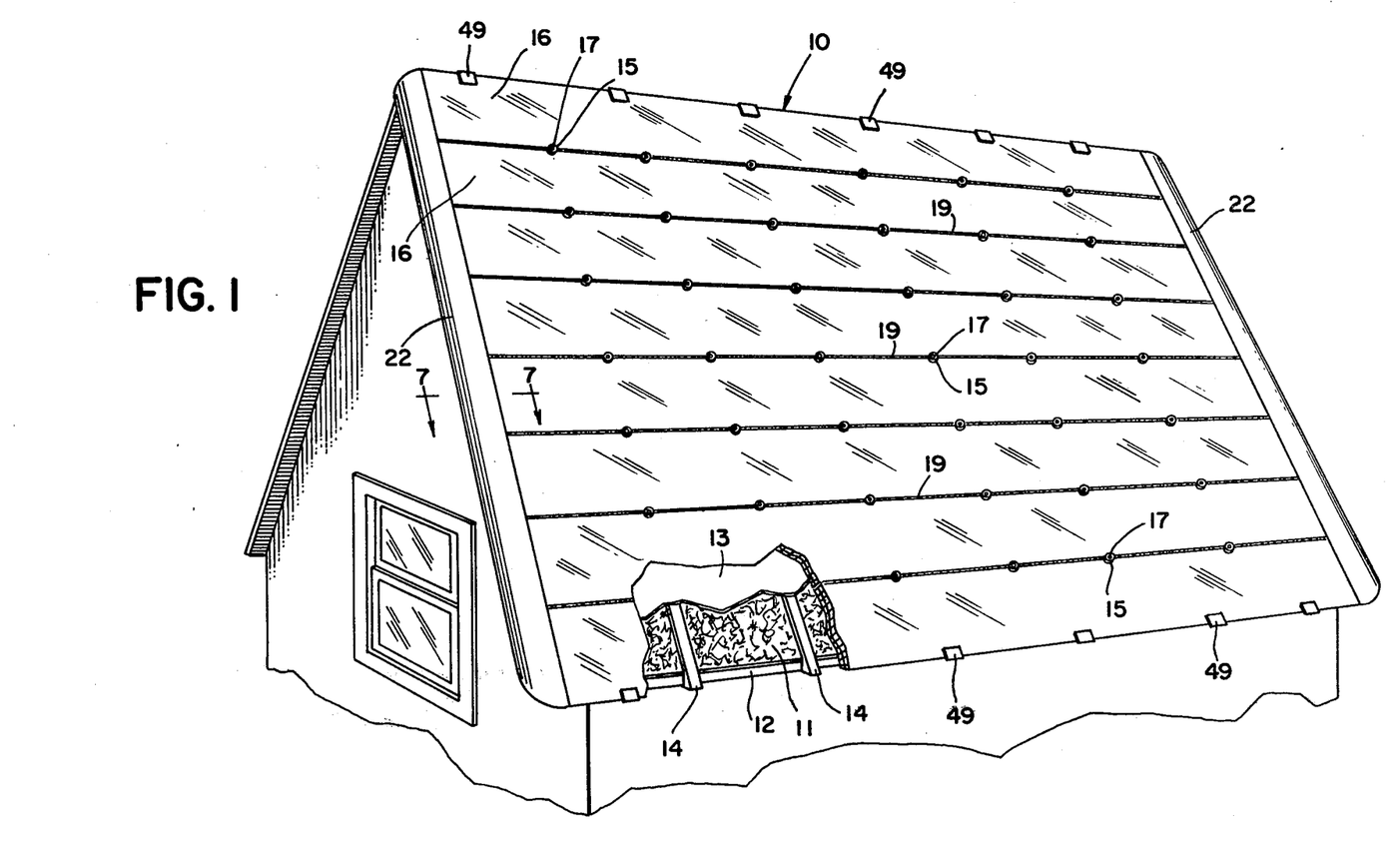
FIG. 1 is a perspective view of the invention applied to a roof structure in longitudinal alignment, partially broken away to expose interior construction details.
Figure 1A:
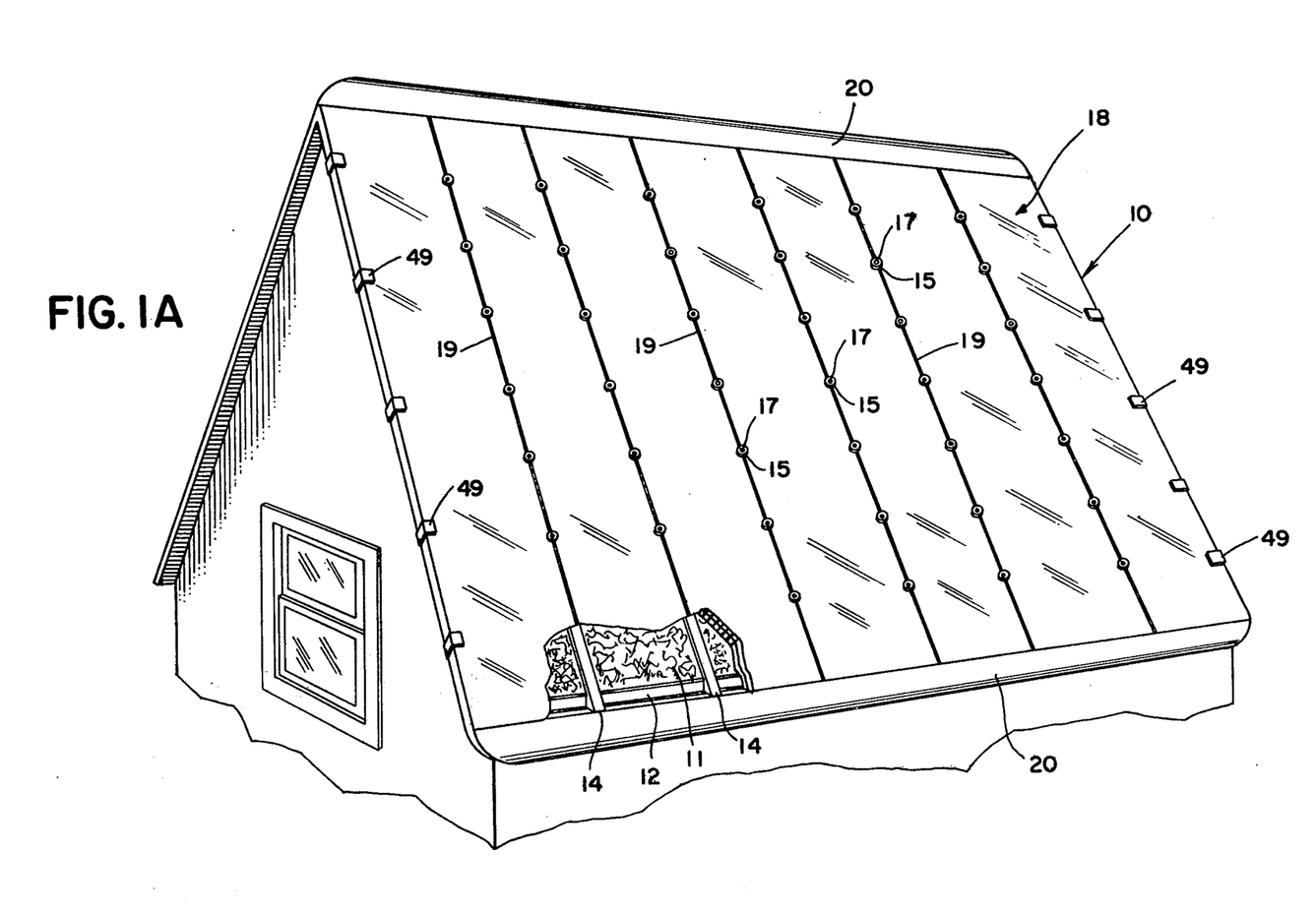
FIG. 1A is a perspective view of the invention applied to a roof structure in transverse alignment, partially broken away to expose interior construction details.

There follows a description of the preferred embodiments of the invention:

Referring now to the drawings, there is shown in FIG. 1, a plurality of solar collector panels 10 which may be conveniently applied to the roof 12 or wall of a building by affixing the solar collector panels directly to the roof rafters 14 or to suitable wall framing members, or to overlays of either of these. For purposes of illustration, the solar collectors 10 are arranged with their channels generally horizontally oriented as indicated by the numeral 16. It will be appreciated that the solar collectors 10 could also be arranged with their channels generally oriented parallel to the vertical structural components of the building as illustrated in FIG. 1A and as indicated by the numeral 18. The horizontal and vertical orientation of the solar collectors 10 will be hereinafter more fully discussed in detail.

Generally, the solar collectors 10 are affixed to the roof 12 with their respective channels in aligned, continuous, juxtaposed relationship. The channels of the various solar collector panels 10 can be joined together in end to end relationship to form a plurality of aligned, continuous, fluid carrying conduits or the collectors 10 could be continuous throughout the full extent of the roof 12. However, this would not be necessary since an advantage is that any length one-piece panels of the invention can be manufactured, as by coextrusion. When the solar collectors 10 are arranged in generally vertical relationship relative to the roof 12, horizontal headers 20 would be endwardly connected to the ends of the solar collectors 10 to carry the solar heated fluid from the roof in the manner hereinafter more fully set forth. When generally horizontally arranged channels are employed by positioning the solar collectors 10 in horizontal alignment as illustrated in FIG. 1, generally vertically arranged headers 22 are provided at the roof edges to receive therein the solar heated fluid from the ends of the channels of the solar collectors to direct this fluid for its useful purpose in the manner hereinafter more fully explained.

In the construction of FIG. 1, the solar collector panels 10 are applied over a plywood or other sheet material backing 13 which is conventionally secured to the roof rafters 14. In the construction of FIG. 1A, solar collector panels 10 are directly affixed to the rafters, as by brackets 49. Insulation 11 preferably is applied below the backing 13 between adjacent rafters 14 in the usual manner. The panels 10 are arranged in juxtaposed relationship with the seams 19 which are defined between adjacent collectors filled with a waterproof material such as caulking. The collectors 10 are firmly secured to the roof at multiple locations by employing fasteners 17 which are affixed into the roof rafters 14. Washers 15 are held by the fasteners 17 to secure adjacent pairs of solar collectors. By employing a plurality of fasteners 17 and washers 15, an extremely sturdy, element resisting exterior roof construction can be provided by the solar collectors 10.

Figures 2, 3:
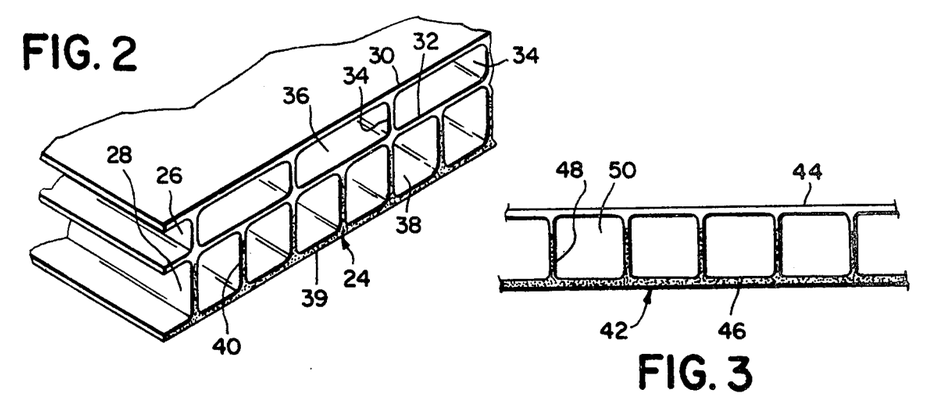
FIG. 2 is an isometric view of a portion of a coextruded solar collector with double window.
FIG. 3 is a partial, sectional view of a coextruded solar collector with single window.

Referring now to FIG. 2, a preferred embodiment of a coextruded solar collector 24, is illustrated, which preferably incorporates the basic structure of the system in a unitary member which is coextruded or duoextruded in a process whereby two or more extruders (not shown) are joined into a common die (also not shown) so as to form an extruded shape having a plastic or different plastics one of which is opaque and the other transparent to solar radiation in defined regions. It is contemplated that the solar collectors 24 will be fabricated of one piece unitary construction of width controlled by the capacity of the extruder itself and of any desired length, for example, long panels of twenty feet in length or more, if desired, this being a noteworthy advantage of the panels of the invention. By utilizing the extrusion process to fabricate a solar collector 24 of unitary construction, the conventional framing members and other metallic or other parts which were always necessary with prior art types of solar collectors can now be completely eliminated.

Generally, the solar collector system of the present invention is fabricated by the extrusion of a transparent covering area generally designated 26 and an integral opaque, black or dark solar radiation absorbing area adjacent thereto and generally designated 28. The transparent covering area 26 comprises generally an outer transparent window or panel 30 and an interior transparent window or sheet 32 which is spaced inwardly from and parallel to the exterior window or panel 30. The transparent covering area 26 is subdivided into a plurality of parallel, longitudinally extending channels 36 which are arranged in adjacent rows and defined one from the other by a plurality of transversely spaced, longitudinally extending transparent ribs 34. The term "transparent" as used herein means transmissive to the major part of the solar spectral radiation; it is intended to include both optically clear windows or with translucent windows, i.e. those with diffuse transmission. The transparent exterior and interior windows 30 and 32 and the plurality of transparent ribs 34 are extruded from the same material and from the same die to form a unitary structure without the need for cutting, shaping, joining or otherwise working the material after the extrusion process has been completed.

The opaque, black or dark colored solar radiation absorbing area 28 is integrally formed with the transparent covering area 26 and includes a solar radiation absorbing base 39 of black material such as suitable polyacrylic pigmented with carbon black. The area 28 is subdivided into a plurality of parallel longitudinally extending channels 38 which are arranged in adjacent rows and defined one from the other by a plurality of transversely spaced, longitudinally extending ribs 40. Ribs 40 are extruded of the same solar radiation absorbing material as base 39. The black ribs function to enhance the strength and rigidity of the unitary solar collector and, since they are absorbing members, provide additional surface area for heating the heat-transfer fluid, which is particularly helpful when heating air.

As illustrated, the transparent covering system channels 36 may be twice as wide in their transverse dimension as channels 38 comprising in the solar radiation absorbing area 28. Transparent ribs 34 of transparent covering area 26 may be extruded coextensive with some of the black material ribs 40 of black absorbing area 28 as illustrated, or transparent ribs 34 may be laterally offset from black material ribs 40, as may be desired. Preferably, transparent ribs 34 align over every other black material absorbing ribs 40 to increase the overall strength of the system. It is contemplated that channels 36 comprising the transparent covering area 26 will normally be filled with an insulating fluid such as an insulating air layer to increase the thermal efficiency of the system. Channnels 38 comprising the opaque, black or dark colored absorbing area 28 are normally filled with a heat transfer fluid which is utilized for building or other space heating purposes. Fluids such as air, water, or mixtures of water with a polyol, like ethylene glycol-water mixture or other anti-freeze solutions may be conveniently employed within channels 38.

In the embodiment illustrated in FIG. 3, there is shown a very simple, basic design of a coextruded, unitary flat plate solar collector 42, which is extruded into a single window design. In this embodiment, a plurality of longitudinally extending heat transfer fluid channels 50 are defined between a clear window or cover 44 and a black or opaque solar radiation absorbing base 46. Preferably, a plurality of ribs 48 are extruded of the same black or opaque material as the base 46. It is contemplated that ribs 48 could also be fabricated of the same clear plastic as the clear window 44 if so desired, for certain applications where the greater thermal efficiency of the black rib system as illustrated would be necessary or desirable.

Figure 4:
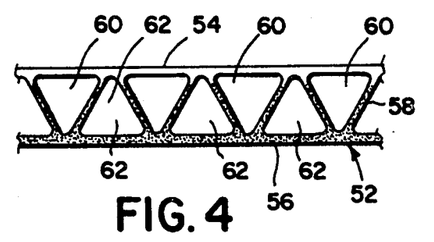
FIG. 4 is a partial, sectional view of a coextruded solar collector with single window and having triangular channels.

Referring now to FIG. 4, there is shown a second modified single window, coextruded, flat plate solar collector 52 which is fabricated by coextruding and which includes a clear window or cover 54 which is spaced above a black or opaque material base 56 a sufficient distance to provide a plurality of longitudinally extending alternate channels 60, 62. A plurality ribs of black material 58 angularly extend between window 54 and base 56 to provide a plurality of adjacent, alternately inverted, triangular cross sectional shaped channels 60 and 62. In the embodiment illustrated, ribs 58 are preferably fabricated of black solar radiation-absorbing material, the same as in base 56. Under certain conditions and in certain applications, it is conceivable that certain or all ribs 58 would also be fabricated of clear plastic similar to the plastic utilized in window 54, should such a unit be required.

In utilizing the single window solar collector 52 of FIG. 4, several different use modes are possible. In the first mode of operation, the heat transfer fluid (not shown) could be transported in the alternate channels 62 with the channels 60 on each side being utilized as insulating dead air spaces. Similarly, the heat transfer fluid (not shown) could be transported in the alternate channels 60 with the channels 62 being utilized as dead air spaces. In another mode of operation, the heat transfer fluid (not shown) could be transported in both sets of adjacent channels 60 and 62. In another mode of operation, special manifolding (not shown) could be provided to enable one set of channels 60 to serve for preheating the heat transfer fluid (not shown) and the other set of adjacent alternate channels 60 could be utilized for final heating of the heat transfer fluid. Special fittings (not illustrated) would be designed for each system so that a header system would be provided which could function to properly direct the heat transfer material at the respective ends of the triangular cross sectional channels 60 and 62.

Figure 5:
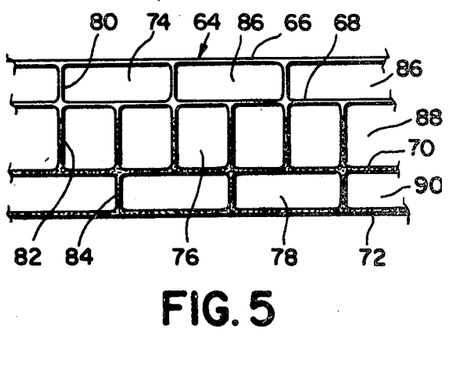
FIG. 5 is a partial, sectional view of a coextruded solar collector having double window and an insulating air layer backing.

Referring now to FIG. 5, there is illustrated a sectional view of a coextruded solar collector of the double window and insulating air layer backing type. This modified solar collector 64 which represents a preferred embodiment of the invention comprises generally a plurality of adjacent, longitudinally extending heat transfer fluid channels 76 which are defined between black base 70 and clear window 68. Heat transfer fluid channels 76 are extruded to extend the length of collector 64 in adjacent, parallel arrangement. Each channel 76 is defined from its adjacent channel 76 by rib 82 which is illustrated as being extruded from the same black plastic as black base 70. In this embodiment, a clear plastic solar radiation insulating air layer 86 is extruded adjacent clear window 68 of heat transfer fluid layer 88. Insulating air layer 86 is subdivided into a plurality of longitudinally extending channels 74 by spaced ribs 80 which are fabricated of the same clear plastic as clear window 66 which defines the outer extent of insulating air layer 86. As illustrated, clear plastic ribs 80 of insulating air layer 86 coincide with and register over alternate black plastic ribs 82 comprising the heat transfer layer 88. Heat transfer layer 88 is defined by black ribs 82 and black base 70 and insulating air layer 86 is defined of all clear plastic including clear windows 66 and 68 and interconnecting ribs 80.

Second insulating air layer 90 is formed over heat transfer layer base 70 and includes black cover 72 which is spaced from solar radiation transfer layer base 70 a sufficient distance to define second insulating air layer 90. A plurality of black ribs 84 are extruded to extend between the black base 70 of heat transfer layer 88 and black insulating air layer cover 72. Preferably, black ribs 84 register below alternate ribs 82 which define channels 76 comprising heat transfer layer 88.

As illustrated, ribs 84 defining channels 78 in insulating air layer 90 do not register below the ribs 80 which define channels 74 of the upper insulating air layer 86 for purposes of stability. However, it will be appreciated that ribs 84 of insulating air layer 90 could register below ribs 80 of insulating air layer 86 if desirable or necessary for any particular application. Additionally, more or fewer ribs 80, 82, 84 may be coextruded to define channels 74, 76, 78 of all the same size, of all different sizes or of some having the same sizes and some of different sizes if so desired for a particular application, and still fall within the meaning and scope of this invention. Likewise the channels can be of different shapes, as shown further below. It will also be appreciated that clear plastic window 68 of heat transfer layer 88 can be fabricated i.e. coextruded of the same black plastic as ribs 82 in part and base layer 70, if so desired and still fall within the meaning and scope of this invention. As described further below it is preferred that the panel be of coextruded plastic wherein the solar-energy absorbing region 70, 82, 72 has a higher softening temperature than the plastic of which the solar-energy transmitting region 66, 68, 80 is made.

Figure 6:
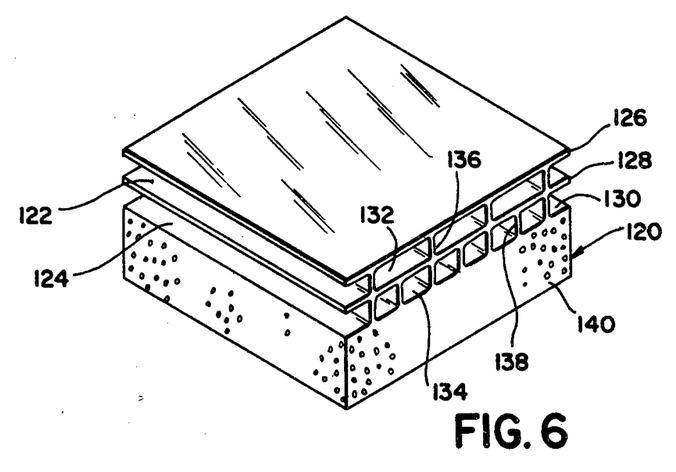
FIG. 6 is a partial, isometric view of a solar collector with coextruded foam backing.

Another modified coextruded solar collector 120 is illustrated in FIG. 6 which includes a plurality of insulating or solar radiation transfer layers 122, 124 which are coextruded to include a plurality of clear material surfaces 126, 128 or black surfaces (not illustrated) which are sub-divided into channels 132, 134 by a plurality of ribs 136, 138 in the manner hereinbefore set forth. An insulating layer 140 is integrally formed as the bottom surface 130 of channels 134 by known processes to provide a solar collector 120 with its insulating foam layer 140. The foam can be any synthetic plastic which is extrudable and foamable such as described further below.

Figure 8:
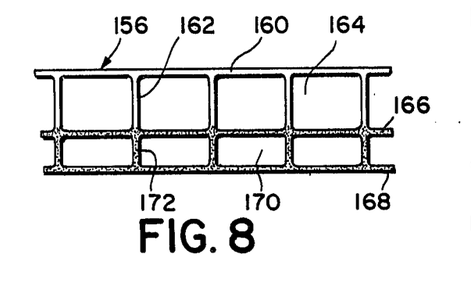
FIG. 8 is a partial, sectional view of a coextruded solar collector including water channels.
Figure 9:
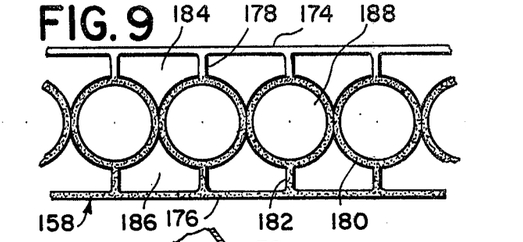
FIG. 9 is a partial, sectional view of a modified solar collector including circular water channels.

In FIGS. 8 and 9, there are shown cross sectional views of coextruded solar collectors 156, 158 which are particularly adaptable for heating water or water-based solutions for such applications as hot water heaters, heaters for buildings, swimming pool heaters, etc. In the embodiment illustrated in FIG. 8, a unitary, coextruded structure 156 is illustrated including a clear plastic window 160 which admits solar radiation in the manner hereinbefore set forth. A plurality of clear plastic ribs 162 depend from the window 160 in spaced relationship to define a plurality of insulating air channels 164. The ribs 162 are coextruded and join the black absorber surface 166 in a unitary construction. A plurality of water carrying channels 170 are defined between the black absorber surface 166 and the base 168 by a plurality of ribs 172. In the embodiment illustrated, the base 168, the ribs 172 and the absorber surface 166 are all fabricated of the same or similar black plastic. As illustrated, the black plastic ribs align beneath the clear plastic ribs 162. It is also within the scope of this invention to extrude the black plastic ribs 172 in offset relationship to the clear plastic ribs 162. The embodiment illustrated in FIG. 8 is similar in construction and concept generally to the embodiment illustrated in FIG. 2 with the exception that the water channels 170 are defined by a black absorber 166 rather than a clear window layer 32. Additionally, due to the increased heat carrying capacity of water over air, the water channels 170 can be constructed smaller than the air carrying channels 38.

In the embodiment illustrated in FIG. 9, the unit 158 is fabricated with a top clear window 174 spaced above a black plastic base 176. A plurality of water carrying channels 188 are defined within a plurality of juxtaposed black absorber surfaces 180 which are tangentially arranged in the coextrusion process. Each black absorber surface 180 is joined to the clear window 174 by a clear plastic rib 178. The black absorber surfaces 180 are also joined to the base 176 by the black plastic ribs 182. The clear plastic ribs 178 and the black plastic ribs 183 serve to unify and strengthen the structure and respectively to admit solar energy and to absorb solar energy. The black absorber surfaces 180 as shown define hollow, cylindrical channels 188 for water carrying purposes. It will be appreciated that channels of other cross sectional configuration may also be formed during the coextrusion process and still fall within the meaning and intent of this invention. The clear window 174, adjacent clear plastic ribs 178 and upper portions of the black absorber surfaces 188 define therebetween a plurality of longitudinally extending insulating air channels 184. Similarly, the black plastic base 176, adjacent black plastic ribs 182 and portions of the black absorber surfaces 180 define therebetween a plurality of juxtaposed, longitudinally extending dead air channels 186 for back insulation purposes.

Figure 7:
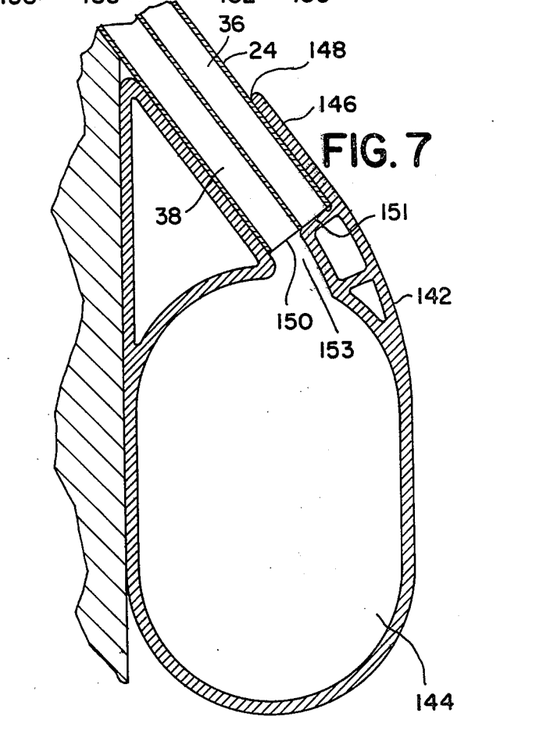
FIG. 7 is an enlarged, cross sectional view through a header taken along line 7—7 of FIG. 1.
Figure 10:
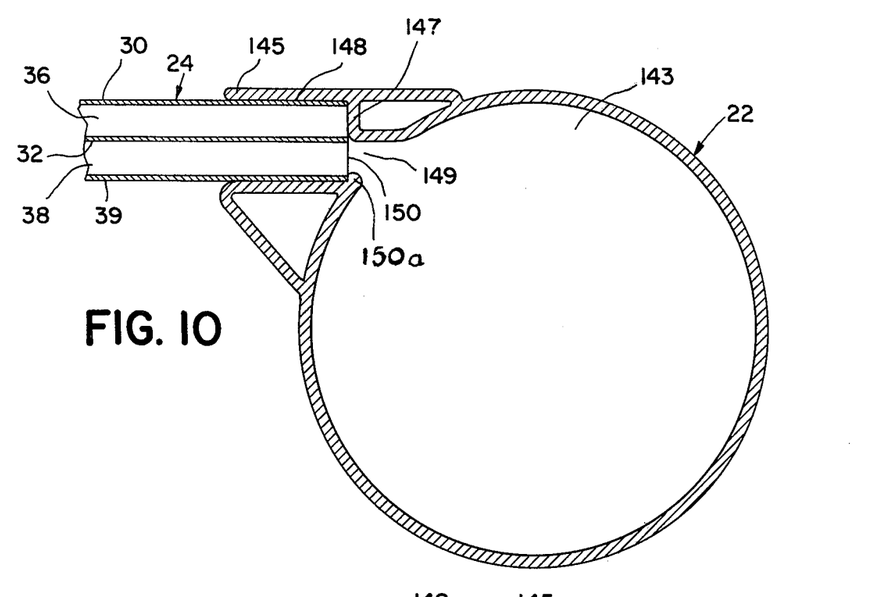
FIG. 10 is a cross sectional view similar to FIG. 7 showing a modified header construction suitable for use with an air system.
Figure 10A:
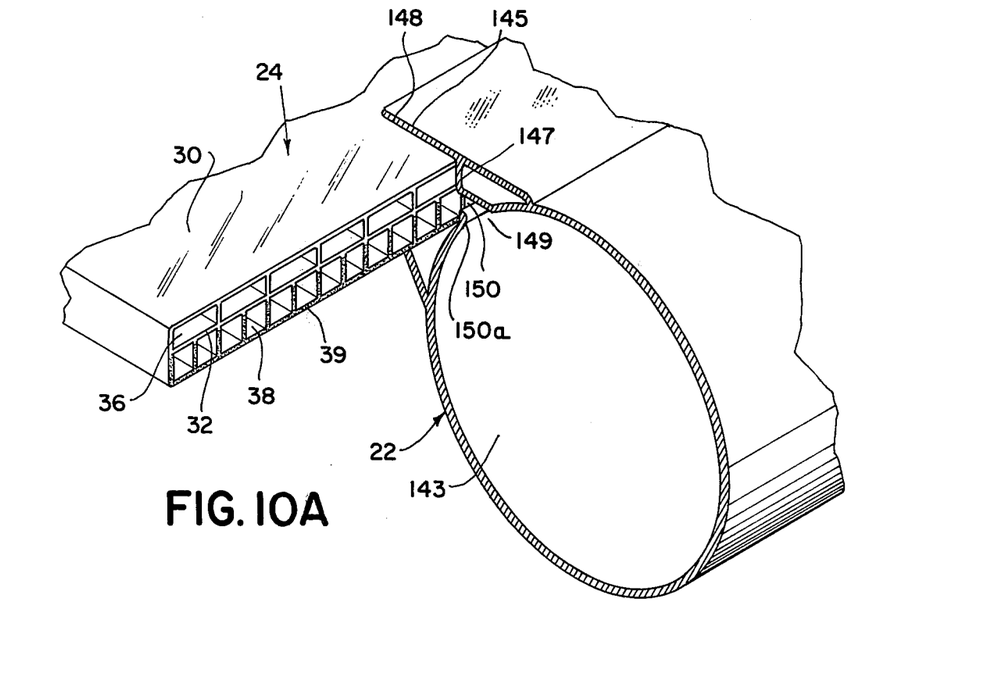
FIG. 10A is a partial, isometric view of the construction of FIG. 10.

Referring now to FIGS. 10 and 10A there is illustrated header 22 which is connected to the ends 150 of a plurality of solar coextruded collectors, for example, collectors 24. The header 22 may be extruded from a thermoplastic plastic such as polycarbonate, in known manner. Header 22 is designed to provide an elongated, cylindrical header space 143 and an elongated connector 145 in communication therewith through the opening 149. Connector 145 is endwardly open to slip over the ends 150 of the solar collectors 24. A sealant 148 is used at the connector 145 for bonding and sealing the header 22 to each solar collector 24 in a substantially leak-proof connection. In some cases, the same sealant may be employed to bond the header 22 directly to the roof rafters 14 or to other building construction members. A stop 147 is extruded in the header 22 of size to abut against and substantially seal the ends of the insulating air channels 36 of the coextruded collectors 24. The header opening 149 communicates with the channels 38 to thereby admit the solar heated medium from within the solar collector 24 into the header interior space 143. There is a small stop 150a against which the bottom edge of the collector abuts, but without blocking the channels. As illustrated in FIG. 7, the stop is, however, not always necessary.

Figure 11:
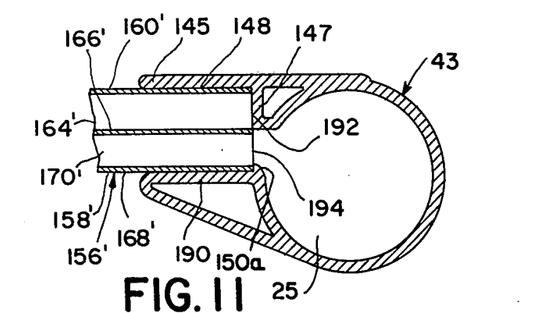
FIG. 11 is a view similar to FIG. 10 showing a modified header suitable for use with a water system.
Figure 11A:
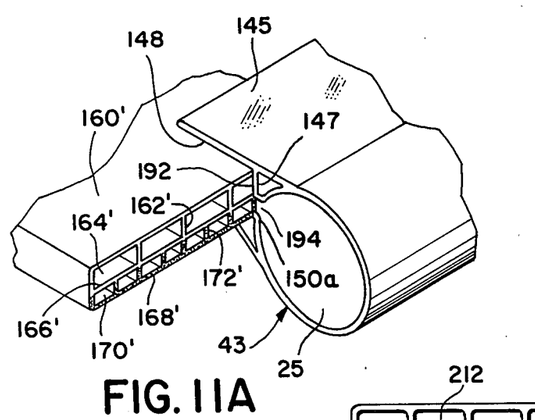
FIG. 11A is a partial, isometric view of the construction of FIG. 11.

In FIGS. 11 and 11A, there is illustrated a modified header 43 which is similar in construction to the header 22 with the exception that header space 25 is extruded to a greatly reduced cross-sectional diameter. It is contemplated that the elongated, cylindrical space 25 defined within the modified header 43 will be approximately 2 inches in diameter as compared to the header space 143 illustrated in FIG. 10 wherein the cross sectional diameter may be on the order of 8 inches. It is contemplated that the header space 25 will be utilized to receive water or other liquid heat transfer medium from water carrying collectors such as illustrated in FIGS. 8 and 9. In the embodiment illustrated, a solar collector 156' positions within the connector 145 and the end is cemented therein by a sealant such as the sealant 148. In the manner similar to that illustrated in FIG. 11, the insulating air channels 164' abut against the stop 192 and are substantially sealed thereby. The ends of the liquid carrying channels 170' communicate directly with the interior 25 of the header 43 through the header opening 194 to introduce all of the solar heated liquid directly into the interior space 25 defined with the header construction. The solar collector 156' is similar in construction and manufacture to the coextruded collector 156 and comprises a plurality of insulating air channels 164' which are juxtaposed to the plurality of water carrying channels 170'. The insulating air channels 164' are defined outwardly by the clear window 160' and inwardly by the interior window 166' and the clear ribs 162'. The water carrying channels 170' are defined by the interior window 166', the black absorber base 168' and the plurality of transversely spaced, black ribs 172'. The solar collector 156' is similar in construction and function to the solar collector 156 with the exception that the black absorber surface 166 of the solar collector 156 is extruded of a clear material to form the clear interior window 166'.

Referring now to FIG. 7, there is illustrated a header 142 which is similar in construction to the header illustrated in FIG. 10 with the exception that the header space 144 is shaped to a different configuration than the header space 143, for example, the space 144 could be substantially oval in cross sectional configuration. An elongated connector 146 extends from the header 142 and is in communication therewith through the opening 153. The connector 146 is endwardly open to receive therein the ends 150 of the solar collectors, for example, collectors 24. A sealant 148 having elastomeric qualities is used to bond the connector 146 to the ends 150 of the collector 24 in a substantially leak-proof connection. A stop 151 is extruded in the header 142 of size to abut against and substantially seal the ends of the insulating air channels 36 of the coextruded collectors 24. The header opening 153 communicates with the channels 38 of the collectors 24 to thereby admit the solar heated medium from within the solar collector 24 into the header interior space 144.

Figure 12:
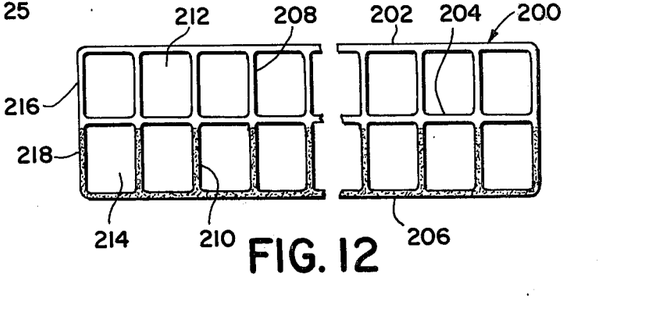
FIG. 12 is a cross sectional view of another embodiment of a complete coextruded solar collector, which is symmetrical with respect to the center plane.

In FIG. 12 is shown another modification of a coextruded solar collector 200 which is similarly fabricated of unitary construction. A clear window 202 defines the upper limit of the insulating air layer 216. The clear cover 204 defines the bottom limit of the layer 126 and also separates the insulating air layer 216 from the heat transfer layer 218. The black base 206 defines the bottom of the heat transfer layer 218. A plurality of clear ribs 208 extend between the window 202 and the cover 204 in parallel, transversly spaced relationship and are extruded to extend the entire length of the collector 200. A symmetrical relationship with respect to the center plane is shown. This facilitates coextrusion fabrication, minimizing tendencies for unsymmetrical shrinkage when cooling after extrusion. Similarly, a plurality of black ribs 210 extend upwardly from the base 206 to the cover 204 and are arranged in parallel, transversly spaced relationship. The ribs 210 align beneath the clear ribs 208 and the embodiment illustrated, but as hereinbefore set forth, it will be appreciated that the collector 200 could also be fabricated with some or all of the black ribs 210 transversly offset from some or all of the clear ribs 208. The clear ribs 208 divide the insulating air layer into a plurality of insulating air channels 212. Similarly, the black ribs 210 subdivide the heat transfer layer 218 into a plurality of longitudinally extending heat transfer channels 214. In the embodiment illustrated, all of the channels 212 and the transfer channels 214 are illustrated to be extruded to the same cross sectional dimensions. Other channels 212, 214 of different cross sectional dimensions could also be extruded in the manner herein described and come within the meaning and scope of this invention. In the embodiment set forth in FIG. 12, it is contemplated that the lateral dimension of the collector 200 could be approximately 16 inches in width and the height could be approximately 1 to 1¼ inches. Utilizing a coextrusion process, the length of the collector 200 could be any desired length, for example, 20 foot planks, which length would be governed by the size of the roof construction and the capacity of the extruders employed in the fabrication of the collector 200. Each channel 212, 214 could be extruded to have a height and a width of between ½ inch to ⅜ of an inch. Such a standard unit would then have a total of 64 channels, 212, 214.

The flat-panel-unit solar collector of the invention is manufactured from any suitable synthetic polymer which is an extrudable thermoplastic. Suitability of a given polymer is related to the particular application, for instance, whether the collector is to be used in different climatic conditions (desert, tropical), solar intensity, etc., or for high or low fluid temperatures. The plastic need not have overall optimum properties, such as high heat distortion temperature when suitable safeguards can be built into the system to prevent overheating if the flow of heat-transfer medium is stopped during solar exposure; other devices can likewise be connected with the system. Desirable materials properties for the light-transmitting portion include: (1) high transmittance of solar radiation; (2) resistance to photo-oxidative degration and general weathering; and (3) ability to be coextruded with the chosen light-absorbing material. Desirable materials properties for the light-absorbing portion include (1) resistance to thermal distortion or deterioration under the highest temperature conditions likely to be found in use; and (2) ability to be coextruded with the chosen light-transmitting material. Other properties desired for both light-transmitting and light-absorbing materials system are: (1) good impact resistance; (2) good low-temperature properties (particularly freedom from brittleness); (3) good mechanical properties (such as high tensile strength, modulus of elasticity, and elongation before break); and (4) reasonable cost.

One thermoplastic material particularly useful for both the transmitting and absorbing portions is polycarbonate (UV-stabilized clear and black). This material has a high heat-distortion temperature. Polycarbonate is produced in the U.S. by Mobay Chemical Corporation (under the name "Merlon") and by General Electric Company (under the name "Lexan"). Other producers are Idemitsu Petrochemical Company (Japan) and Teijin Chemical Ltd. (Japan). Another material for both the transmitting and absorbing regions is poly(methyl methacrylate) or PMMA. This plastic is produced by Rohm and Haas Company ("Plexiglas"), by du Pont ("Lucite"), and by many other manufacturers. PMMA or high impact acrylics (e.g., "Plexiglas DR") may be used when means for preventing overheating by accidental shut-off of flow of the heat-transfer medium are provided. A high-temperature useful candidate material for both regions is polyethersulfone; this material has a tensile strength of 4700 psi at 180° C.

Other polymers which are suitable for the light-transmitting region include perfluoroalkoxy (PFA) resins; ethylene-tetrafluoroethylene copolymer (ETFE); poly(vinylidene fluoride) ("Kynar" $PVF_2$); fluorinated ethylene propylene copolymer ("Teflon" FEP); and poly(ethylene-chlorotrifluoroethylene) ("Halar" E-CTFE). For the light-absorbing region other polymers which are suitable include: polysulfone; polyaryl sulfone; polyphenylene oxide and its copolymers; polybutylene; and polypropylene, which may be modified with talc, glass microspheres, or other reinforcing filler.

By judicious selection of the mechanical, thermal, and optical properties it is possible to combine in the solar collector of the invention, the material of choice for the particular circumstances. For a tough material with best impact resistance and best resistance to heat distortion, a polycarbonate, especially a UV- stabilized natural polycarbonate is desirable. Thus, a panel of the invention can be made of a polycarbonate for the solar radiation absorbing region and with a poly(methacrylate) for the solar radiation transmitting region. When it is desired to provide additional protection against photo-oxidative degradation, it may be advisable to overlay the polycarbonate with a thin layer of acrylic polymer. This may be carried out by coextruding the acrylic with the other plastic, or if desired by applying that thin layer by continuous lamination, or other methods. Likewise other suitable synthetic polymers may be selected for co-extrusion for the manufacture of the solar collector of the invention taking into consideration their properties, which are well known.

It is within the contemplation of the invention to join a section or portion of a panel which has been singly extruded, to another singly extruded section or portion, to form the one piece panel of the invention, e.g. to join a solar energy transmitting section and a solar radiation absorbing section, or portions thereof.

While reference through the specification has been mainly to carbon black as the component of the coextruded collector which is the solar radiation absorbing area it is of course within the contemplation of the invention to use other materials than carbon black which are equivalent in effect. Black iron oxide pigment is an example of such a material.

Also, the thermoplastic can be filled with inorganic materials such as glass, glass beads, glass fibers, asbestos fibers, talc, or calcium sulphate fibers or other materials which have the effect to reduce the coeffecient of thermal expansion of the synthetic plastic. Indeed any of the means known for changing or modifying the physical or other properties of the plastic to bring about the desired effect in the final panel can be used providing, in accordance with the invention, that the solar panel is a single unit having the two areas described above.

Tests using a solar thermal collector of the invention using air as the fluid being heated registered an initial temperature 29° C. which moved rapidly at a rate of about 2.4° C. per minute to reach 100° C. under stagnant flow conditions. The collector was an all-acrylic unit. In further experiments a collector of the invention having a double window, such as is shown in FIG. 2 exhibited a large difference in surface temperatures between the black zones and the transparent zones of the fluid-heating channels. The efficiency of the system, the energy ratio of thermal collection to incident solar energy, is about 30 percent when the air is being heated at 87° C.; at 60° C., the efficiency is about 50 percent.

The coextruded solar collectors of the invention are useful not only for heating of houses and structures, but also for heating water for swimming pools. Such designs are shown in FIG. 8 and FIG. 9 wherein the water channels are represented by the black areas.

The panels of the invention can be extruded to any desired length, this is contrast to the prior art. Thus, panels of the width or length of the entire roof (e.g. 50 feet) can be manufactured. The panel of the invention may then be fastened to the rafters to become an integral part of the roof structure. Elastomeric sealants (e.q. polysulfide or silicone) could be used between adjacent panels. Unlike the conventional panels it need not be affixed on top of the roof; that is, it could be the roof itself. The panels of the invention can also be used as walls or fences in vertical or in any other desired angular position which is consistent with the desired purpose.

In accordance with the invention the following term has the following meaning:

Unit is a one-piece, unitary structure or body or article, having a continuity of structure, which does not include constructions united by such means as fasteners, or fastening, or a plurality of interconnected pieces. The unit of the invention is a one-piece structure.

It should be noted however that once the unit has been constructed as a single one-piece thermoplastic structure as by simultaneous fabrication of the plastics in a continuous process, it does not preclude making provisions in that one-piece structure for another material (like metal, wood, etc.). But this is provided after the one-piece coextruded structure of the invention has been manufactured and it does not disrupt the continuity or continuum of the thermoplastic material. It is therefore contemplated that the invention as claimed include such structures. For instance provisions may be made in the structure of the invention for metal rods or tubing or brackets for a functional or a decorative purpose.

From the above description it is evident that the invention provides a highly practical, low cost device for efficient use of thermal energy.

Extrusion of plastics is known and disclosed and so is coextrusion wherein plastics are simultaneously coextruded, for instance in the following U.S. Pat. Nos. 2,747,244; 3,461,490; 3,385,917, also from such publications like: Coextrusion Moves into the Big League, Modern Plastics, pages 74–77, September 1970; Modern Plastics, page 176, August, 1968; Modern Plastics, page 130, April 1968; Modern Plastics, Tooling for Flat Coextrusion, April, 1972; The Lid's off Coextrusion, Modern Plastics, Pages 46–47, June, 1971, and in Society of Plastic Engineers, page 48, August, 1971. This reference to literature on coextrusion does not purport to be complete, since one skilled in the art can find other such references.

I claim:

1. A unitary solar thermal collector panel highly effective in absorbing and transferring thermal energy and having resistance to thermal distortion, the panel being constituted of a coextruded, self-supporting synthetic thermoplastic integral unit and being adapted to collect and transfer solar energy which comprises
    (a) a first section defining a first region, the first region being adapted to allow the passage of solar radiation, the first region being divided into a plurality of first channels of which adjacent first channels are defined by first common ribs; and
    (b) a second section defining a second region juxtaposed from the first region, the second region being capable of absorbing solar radiation and transferring it to a fluid, the second region being divided into a plurality of second channels of which adjacent second channels are defined by second common ribs; and the first and second regions being defined one from the other by a common divider.

2. The panel of claim 1 wherein the first and second regions respectively, are essentially completely occupied by the said first and second channels.

3. The panel of claim 2 wherein the channels in the second region are separated by ribs which are opaque and capable of absorbing solar radiant energy.

4. The panel of claim 2 wherein the second channels in the second region have cross-sections which are closed curves.

5. The panel of claim 2 wherein in the first region the channels are closed channels.

6. The panel of claim 1 which comprises also at least one of the following additional regions: (c) a third region which is adapted to allow for the passage of solar radiation and defining a space adapted to allow for the confinement of a fluid, or (d) a fourth region which is adapted to absorb the solar radiation and for transferring thermal energy to a fluid and defining an area adapted to allow for the directed movement of the heated fluid within the third region (b), said third or fourth region (c) or (d) being positioned between the first and second regions (a) and (b) and being defined from regions (a) and (b) by a common divider.

7. The panel of claim 6 which comprises one additional region.

8. The panel of claim 6 wherein third region (c) is divided into a plurality of third channels of which adjacent third channels are defined by third common ribs.

9. The panel of claim 6 wherein the additional region is divided into a plurality of channels, which adjacent third and fourth channels are defined by third and fourth common ribs, respectively.

10. The panel of claim 6 wherein the ribs in the fourth region (d) are opaque to solar energy.

11. The panel of claim 6 which comprises both a third region (c) and also a fourth region (d).

12. The panel of claim 6 wherein the wall between the first region (a) and the adjoining additional region (b) or (c) is transparent.

13. The panel of claim 1 wherein the divider is opaque to solar radiant energy.

14. The panel of claim 1 wherein the divider is capable of transmitting solar radiant energy.

15. The panel of claim 1 in which the solar radiation-passing region (a) is of one or more clear thermoplastic material and the solar- radiation-absorbing region (b) is of one or more pigmented thermoplastic material.

16. The panel of claim 1 wherein the plastic of the solar-energy-absorbing region has a higher softening temperature than the plastic of the solar-energy-transmitting region.

17. The panel of claim 1 which comprises a fluid confined in the first channels of the first region, which fluid is an insulating fluid.

18. The panel of claim 17 in which the insulating fluid is air.

19. The combination of the panel of claim 1 and a header which defines an interior space, one end of the first channels in the first region of the panel being in fluid-blocked relationship with respect to the header space and the same end of the second channels in the second region of the panel being in fluid-communicating relationship with the header space, the header being adapted to admit and circulate the fluid to be heated, and wherein the header comprises blocking means to block the said one end of the first channels to prevent fluid flow through the said one end into the space.

20. The combination of claim 19 wherein the header comprises connection means which has a first part which cooperates with the blocking means to connect the header to the section defining the first region and a second part which connects the header to the section defining the second region of the panel.

21. The combination of claim 19 wherein the header is adapted to slip over the ends of the panel and be bonded thereto into a leak-proof connection.

22. The combination of claim 19 wherein the header is a one piece, extruded thermoplastic.

23. The combination of claim 22 wherein the plastic of the header is polycarbonate polymer.

24. The panel of claim 1 wherein the first and second section define an interface of a region allowing passage and a region absorbing solar radiation, which interface is free of physical interface and of physical discontinuity.

25. The unitary solar collector panel of claim 24 having a light-transmitting region and a light-absorbing region, and light transmitting and light-absorbing regions constituting a continuum of adjoining first and second channels.

26. The solar collector panel of claim 1 which is a flat plate.

27. The panel of claim 1 which comprises a coextruded foam layer adjacent to the second region (b).

28. The panel of claim 27 wherein the foam layer is of the same thermoplastic as the first and second regions.

29. The panel of claim 1 wherein the first region is a clear polycarbonate polymer and the second region is a pigmented polycarbonate polymer.

30. The panel of claim 1 wherein the first region is a clear polycarbonate polymer and the second region is a pigmented acrylic polymer.

31. The panel of claim 1 which comprises a heat-transfer fluid in the second region.

32. The panel of claim 31 wherein the fluid is air.

33. The panel of claim 31 wherein the fluid is water.

34. The panel of claim 31 wherein the fluid is a glycol-water mixture.

35. The panel of claim 1 wherein the first and second regions are of different synthetic plastics.

36. The panel of claim 35 which is rigid.

37. A solar thermal collector system of high efficiency in collection, transfer and circulation of solar thermal energy and high resistance to heat distortion, which system comprises, in combination: (1) a panel and (2) a header, (1) the panel being unitary and constituted of a coextruded, self-supporting synthetic thermoplastic integral unit and being adapted to collect and transfer solar energy, which panel comprises (a) a first section defining a first region, the first region being adapted to allow the passage of solar radiation, the first region being divided into a plurality of first channels of which adjacent first channels are defined by first common ribs; and (b) a second section defining a second region juxtaposed from the first region, the second region being capable of absorbing solar radiation and transferring it to a fluid, the second region being divided into a plurality of second channels of which adjacent second channels are defined by second common ribs; and the first and second regions being defined one from the other by a common divider;

(2) the header defining an interior space, and (3) blocking means for causing one end of the first channels of the first region of the panel to be in fluid-blocked relationship with respect to the interior space of the header and adapted to confine the fluid in the first channels of the first region, the same end of the second channels of the second region of the panel being in fluid-communicating relationship with the interior space of the header, whereby the header is adapted to admit and circulate the heated fluid from the second channels of the second region into the interior space of the header.

38. The system of claim 37 wherein the header is of an extruded thermoplastic.

39. The system of claim 38 wherein the header is of the same extruded thermoplastic as the panel.

40. The system of claim 39 wherein the header is a polycarbonate polymer.

41. The system of claim 37 wherein the header is adapted to be fitted over the ends of the channels of the outer and inner regions.

42. The system of claim 37 wherein the header integrally comprises connector means adapted to fit onto the ends of the first channels.

43. The system of claim 37 wherein the system comprises air in the first channels of the first region and in the second channels of the second region.

44. The system of claim 37 wherein the panel is flat.

45. A combination of the solar thermal collector system of claim 37 and a structure to be heated by the system, the system being adapted to be in heat-conveying relationship with the structure, whereby the system supplies collected and transferred solar energy to the structure.

46. The combination of claim 45 wherein the system is affixed to the structure.

47. The combination of claim 45 wherein the structure is a building with a roof supporting structure.

48. The combination of claim 47 wherein the panels of the system cover the width or length of the roof structure.

49. The combination of claim 47 wherein the panels are positioned with the general direction horizontal along the width of the roof.

50. The combination of claim 45 in which the header is of an extruded thermoplastic.

51. The combination of claim 45 in which the header is of the same extruded thermoplastic as the panel.

52. The combination of claim 45 in which the panel is a polycarbonate polymer.

53. The combination of claim 45 in which the panel is flat.

54. The combination of claim 45 wherein the system comprises air in the first channels of the first region.

55. The combination of claim 45 wherein the panels are at least 8 feet long.

56. The combination of claim 45 wherein the panels are adapted to be an integral part of the roof structure.

57. The combination of claim 45 and a mounting system which allows for linear, planar movement of the unit with thermal expansion, but which prevents curling out of the plane.

58. The panel of claim 37 wherein the first channels in the first region are separated by ribs which are transparent.

59. The system of claim 37 wherein the second channels in the second region (b) have common ribs which are capable of absorbing solar radiant energy.

60. The system of claim 37 wherein the second channels in the second region (b) have common ribs which are capable of transmitting solar radiant energy.

61. The system of claim 37 wherein the common divider between the first region and the second region is capable of transmitting solar radiant energy.

62. The system of claim 61 which comprises also at least one of the following additional region: (c) a third region which is adapted to allow for the passage of solar radiation and defining a space adapted to allow for the confinement of a fluid, or (d) a fourth region which is adapted to absorb the solar radiation and for transferring thermal energy to a fluid and defining an area adapted to allow for the directed movement of the heated fluid within the fourth region (b) said third or fourth region (c) or (d) being positioned between the first and second regions (a) and (b) and being defined from regions (a) and (b) by a common divider.

63. The system of claim 62 which comprises one additional region.

64. The system of claim 63 wherein the common divider of the first and third regions is capable of transmitting solar radiant energy.

65. The panel of claim 1 wherein the first region is a clear acrylic polymer and the second region is a pigmented polycarbonate polymer.

66. The panel of claim 65 wherein the acrylic polymer is a poly(methyl methacrylate).

67. The panel of claim 65 wherein the polycarbonate polymer is UV-stabilized.

68. The panel of claim 65 wherein the polycarbonate has an overlay of a thin layer of an acrylic polymer.

* * * * *